Aug. 4, 1959
C. J. STALEGO ET AL
2,897,874
METHOD AND APPARATUS OF FORMING, PROCESSING AND ASSEMBLING FIBERS
Filed Dec. 16, 1955
6 Sheets-Sheet 1
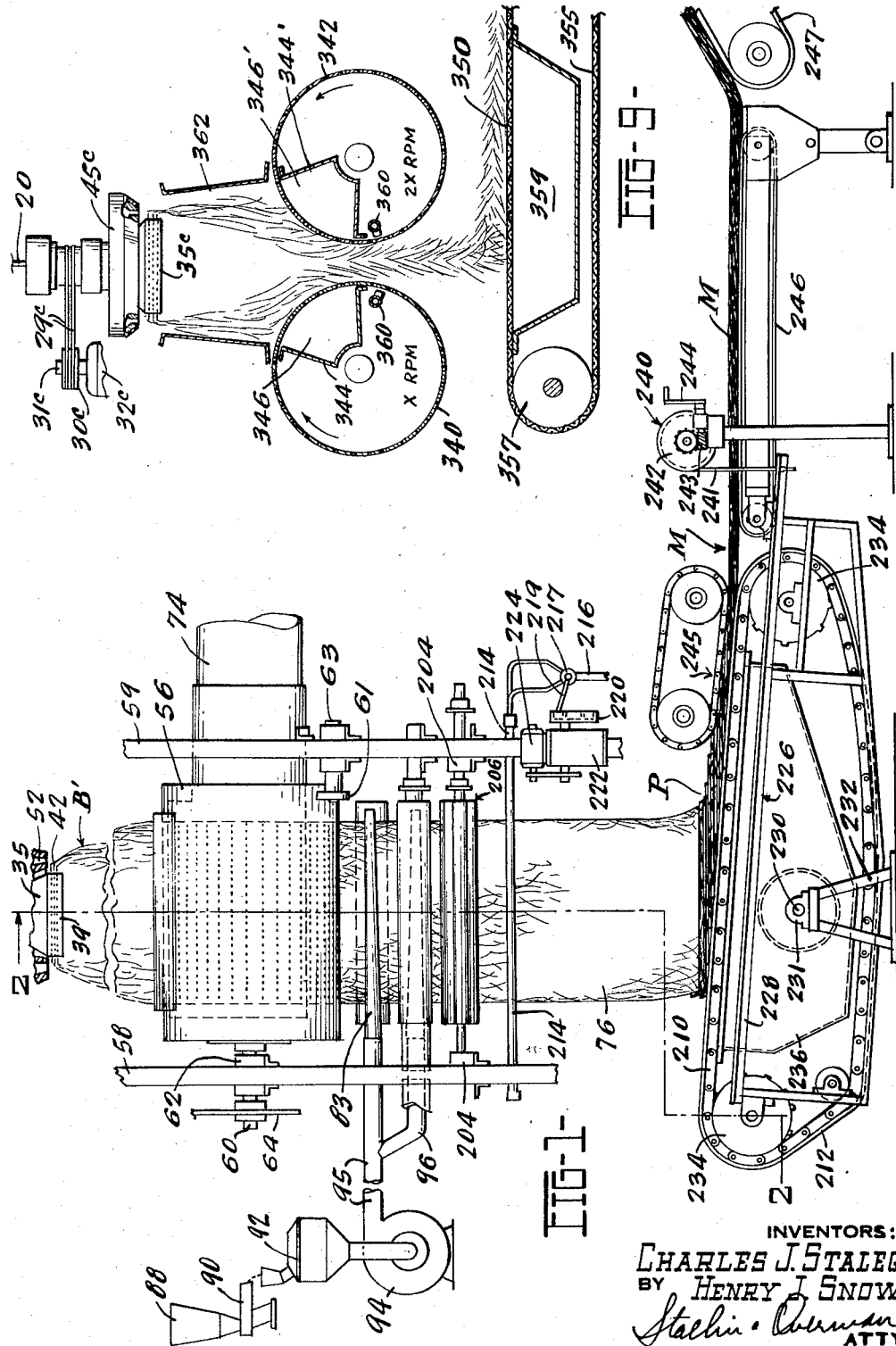
INVENTORS:
CHARLES J. STALEGO,
BY HENRY J. SNOW.
ATTYS

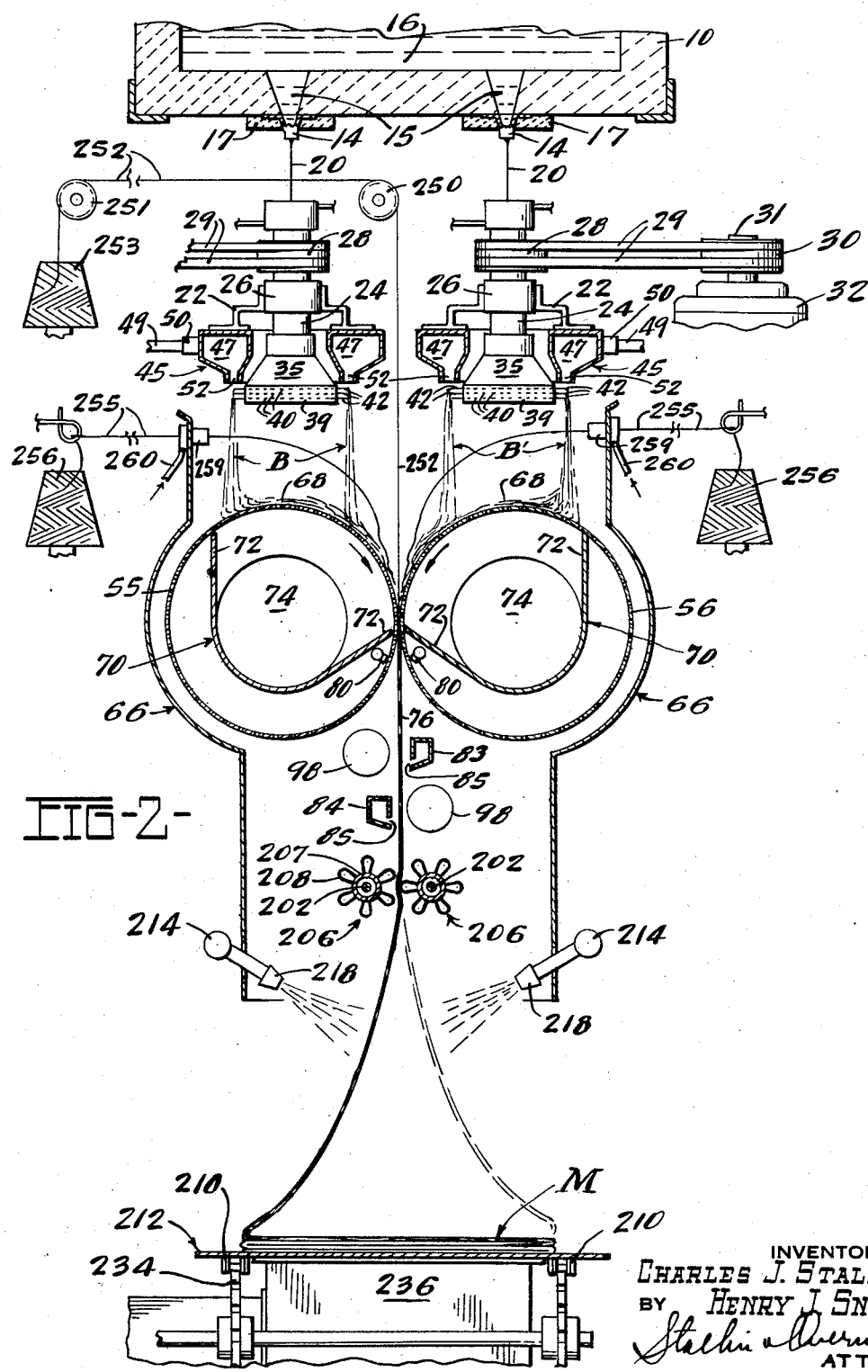

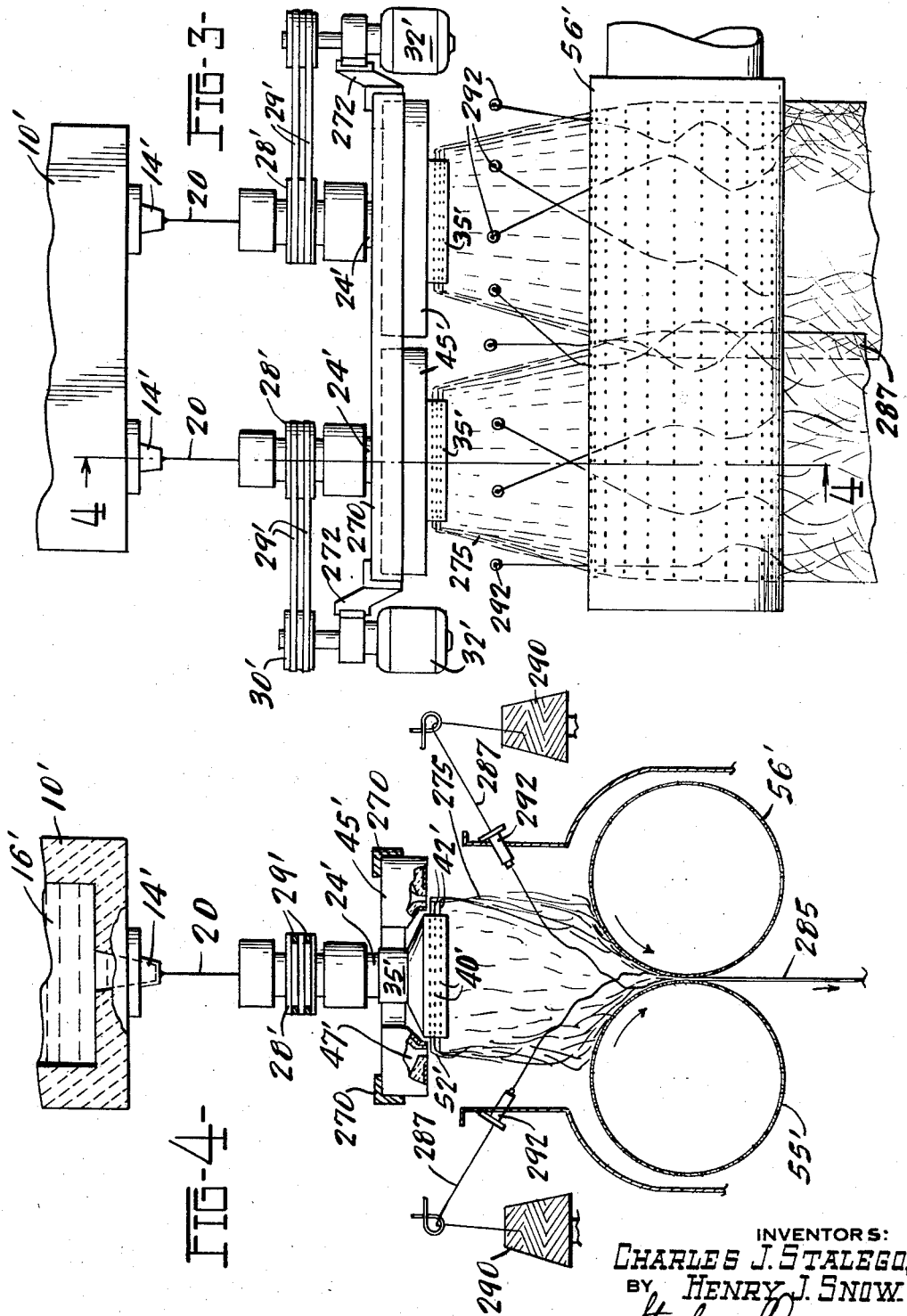

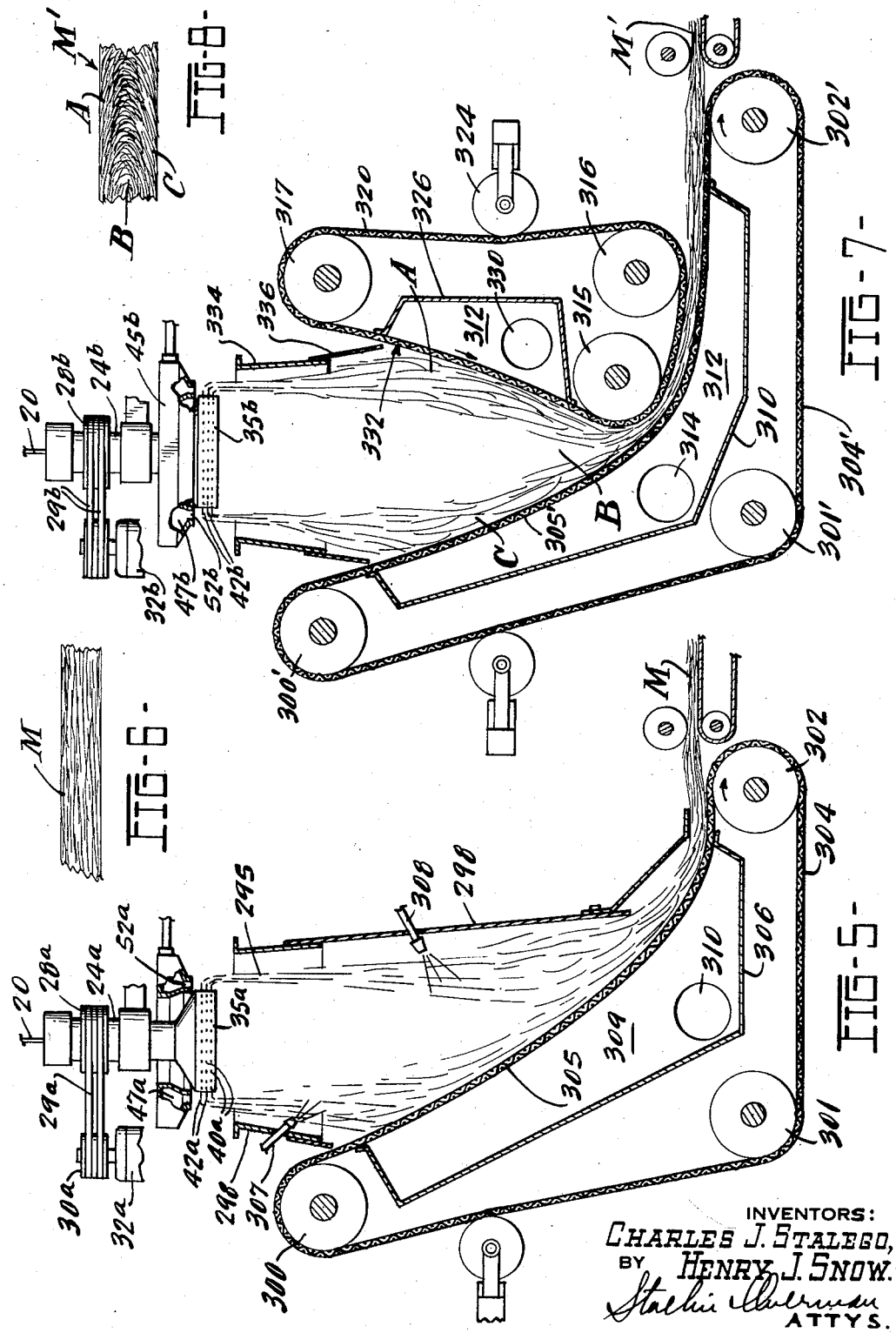

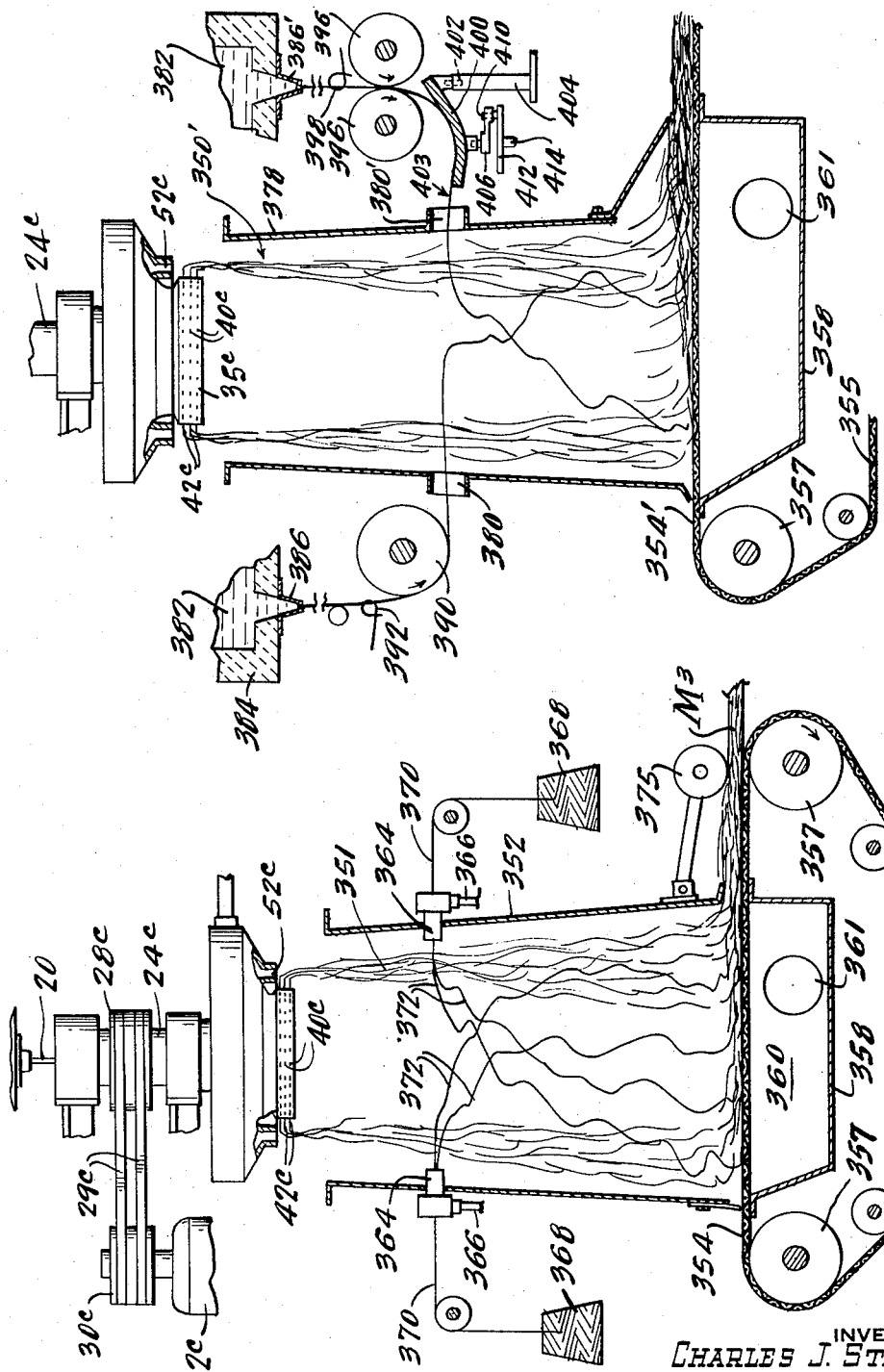

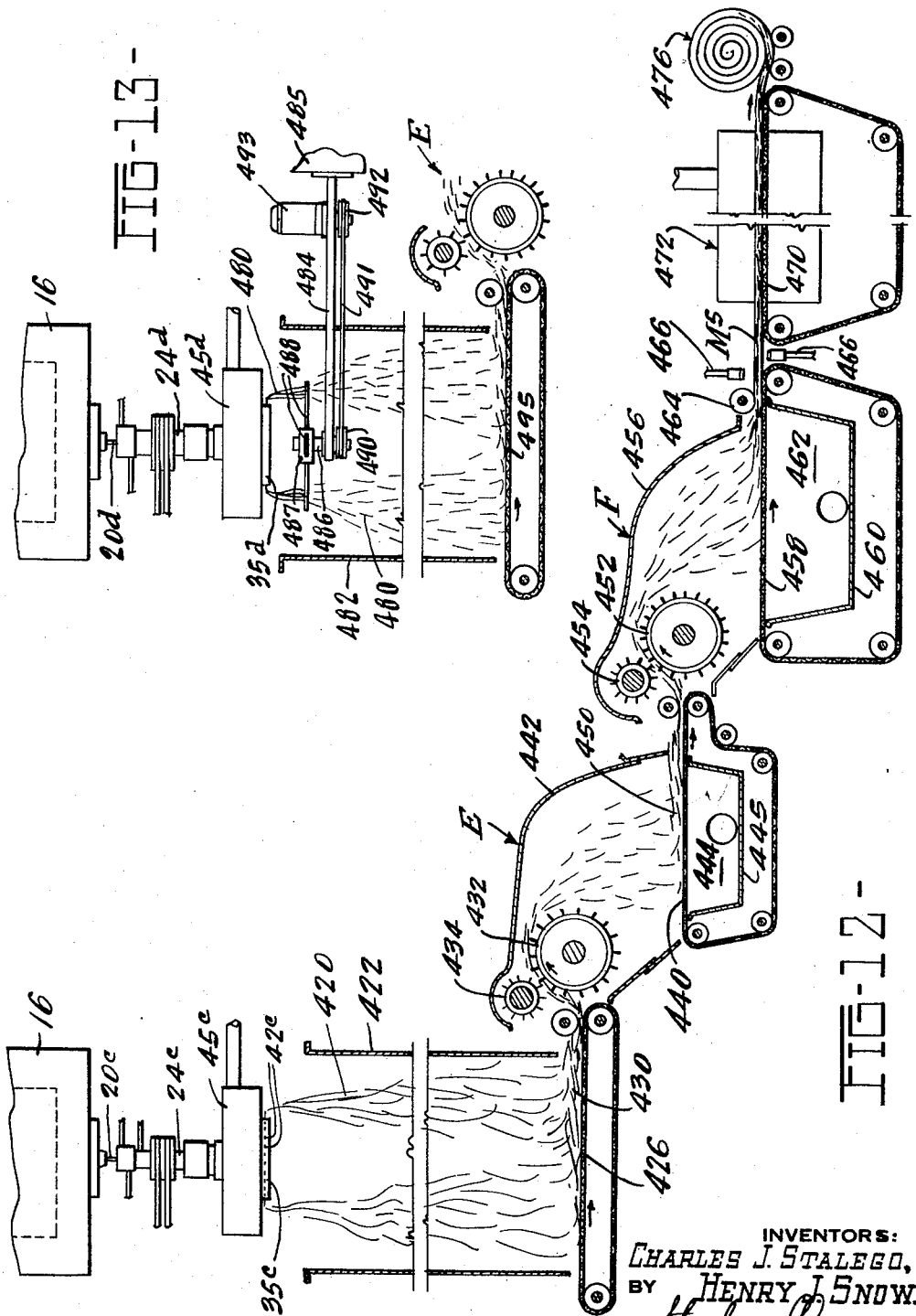

2,897,874

METHOD AND APPARATUS OF FORMING, PROCESSING AND ASSEMBLING FIBERS

Charles J. Stalego and Henry J. Snow, Newark, Ohio, assignors to Owens-Corning Fiberglas Corporation, a corporation of Delaware Application December 16, 1955, Serial No. 553,451

12 Claims. (Cl. 154—27)

This invention relates to method and apparatus for producing fibers from heat-softenable mineral materials and processing the fibers to form mats of the fibers wherein the fibers are oriented in a pattern or assembled in a multilayered formation, providing a high-strength mat endowed with effective sound and heat insulating characteristics.

Mats or bats formed of mineral fibers, such as glass, have been made and sold commercially for heat and sound installation in building structures, appliances and for general purposes where heat and sound insulation is desired. Fibers of the character employed in such mats made from glass have been produced by engaging streams of glass with blasts of intensely hot burned gases, steam, or compressed air, which draw out or attenuate the streams to fibers. The fibers so formed are collected in a mass, and if mass integrity is desired in the mat, a binder is applied to the mass. In processes where the fibers are collected in haphazard formation, many of the fibers extending from one major face through the mat to the other major face provide facile paths for the transmission of heat through the mat impairing the insulating efficiency of the product.

The present invention embraces a method and apparatus for forming fibers and processing the fibers into mat formation wherein the fibers are oriented in a manner to substantially avoid or reduce the projection of individual fibers from one major face of the mat to the other.

An object of the invention resides in a method of forming fibers by projecting bodies of glass or other fiber-forming mineral material by centrifugal forces into an attenuating blast wherein the material is formed into fine fibers and collecting the formed fibers in a manner whereby a mat of high strength having improved insulating characteristics is formed, obtaining the advantages of a laminar construction with a minimum of processing operations.

An object of the invention embraces the steps of forming fibers of mineral material in a manner providing a generally cylindrical beam or configuration of fibers and flattening the cylindrical formation of fibers to provide a fibrous web or mat wherein the fibers of one zone or layer of the mat do not extend or project through to another zone or surface whereby the insulation factor is greatly improved over conventional fibrous insulating units.

Another object of the invention resides in a method of processing fibers formed from heat-softenable mineral materials wherein the attenuated fibers are disposed in a downwardly moving tubular or hollow formation, the fibers being reduced to generally uniform lengths by severing the fibers while they are in flight.

Another object resides in a method of processing a tubular formation of attenuated mineral fibers by engaging the formation of fibers with one or more surfaces moving at speeds and in directions to establish a reorientation of the fibers and collecting the fibers to form a mat having improved strength and insulating characteristics.

Another object of the invention resides in a method of delivering fibers from a fiber attenuating blast into engagement with surfaces moving at different linear speeds whereby to change the orientation of the fibers and enabling the formation of a comparatively thick mat wherein the fibers are substantially uniformly distributed throughout the mat in a formation providing improved insulating characteristics.

Another object of the invention resides in a method and apparatus of forming fibers from heat-softened material by projecting the material into an annularly shaped attenuating blast and engaging the attenuated fibers with a surface moving in the general direction of the paths of traverse of the blast entrained fibers whereby the fibers are oriented at a collecting zone in a manner providing a fibrous mat having high insulating characteristics and of comparatively low density.

Another object of the invention resides in a method and apparatus for attenuating heat-softened material to fibers wherein the formed fibers move away from the attenuating blast in generally circular cylindrical formation, introducing continuous linear reinforcing media into engagement with the attenuated fibers and collecting the attenuated fibers and reinforcing media to form a high strength fibrous body.

Another object of the invention resides in a method and apparatus for attenuating heat-softened material to fibers wherein the formed fibers move away from the attenuating blast in cylindrical formation, introducing continuous bundles of fibers into engagement with the attenuated fibers and collecting the attenuated fibers and continuous bundles of fibers to form a reinforced fibrous body wherein the continuous bundles of fibers may be arranged in spaced parallel relation, in random formation or a combination of both.

Another object of the invention embraces the formation of fine fibers by directing fiber-forming material under the influence of centrifugal forces into a gaseous attenuating blast to form a generally tubular configuration of the fibers and collapsing the configuration of fibers to a planar formation providing a mat wherein the fibers do not project through the mat from one major surface thereof to the other.

Another object of the invention resides in a method of processing fibers formed from heat-softenable mineral materials into a substantially cylindrical pattern, collapsing the cylindrical pattern of fibers to planar formation and folding the planar formation in successive laps to form a laminated fibrous mat.

Another object of the invention embraces a method of forming and processing fibers including the steps of distributing heat-softenable fiber-forming mineral material by centrifugal forces into a gaseous blast wherein the material is attenuated to fibers in a tubular or beamlike pattern and delivering continuous bundles of fibers in the form of strands or yarns into engagement with the attenuated fibers and assembling the attenuated fibers and continuous strands or yarns into a mat formation having high strength characteristics.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic side elevational view showing one form of apparatus for carrying out the method of the invention;

Figure 2 is a vertical sectional view taken substantially on the line 2—2 of Figure 1;

Figure 3 is a side elevational view of a fiber attenuating and mat forming apparatus embodying fiber-forming units arranged to form a fibrous body of substantial width;

Figure 4 is a vertical sectional view taken substantially on the line 4—4 of Figure 3;

Figure 5 is a longitudinal semidiagrammatic sectional view showing an apparatus for carrying out the method of collecting fibers to obtain a modified orientation of the fibers in a mat;

Figure 6 is a longitudinal section through the mat formed by the apparatus shown in Figure 5;

Figure 7 is a longitudinal semidiagrammatic sectional view illustrating another form of apparatus for modifying the fiber orientation;

Figure 8 is a longitudinal section through the mat formed by the apparatus shown in Figure 7;

Figure 9 is a semidiagrammatic view showing a modified form of apparatus for forming a fibrous mat;

Figure 10 is a longitudinal sectional view of an apparatus illustrating a method of combining reinforcing material with attenuated mineral fibers;

Figure 11 is a modified form of apparatus for assembling reinforcing material with attenuated mineral fibers to form a reinforced product;

Figure 12 is a longitudinal semidiagrammatic sectional view illustrating an apparatus for processing a tubular beam of fibers to form a fibrous mat, and Figure 13 illustrates an apparatus for severing mineral fibers while in flight and processing the severed fibers into a mat structure.

While the forms of apparatus illustrated are especially adapted for carrying out the method of orienting fibers for forming mat constructions from glass fibers, it is to be understood that the apparatus and method may be utilized in producing various kinds of fibrous products from other kinds of fibers, such as those formed from fusible rock, slag, or similar materials.

Referring to the drawings in detail and initially to Figures 1 and 2, the form of apparatus illustrated is, in actual construction, of considerable size and is adapted to form a fibrous mat of several feet in width. The apparatus shown in Figures 1 and 2 for carrying out the method includes one or more fiber-forming units wherein elongated glass bodies formed by centrifugal forces are projected into annularly shaped gaseous blasts and attenuated to fibers. The fibers are collected upon a moving surface or surfaces forming a fibrous web layer or veil which is assembled to form a multiple layer or laminar mat having improved sound attenuating and heat insulating characteristics.

Disposed above the fiber-forming apparatus is a forehearth 10 connected with a melting furnace (not shown) in which glass batch or other fiber-forming material is reduced to a molten or flowable state. The material from the melting furnace is fined as it flows into the forehearth 10 providing a supply of molten glass or other fiber-forming material.

The forehearth 10 is equipped with feeders or bushings 14 in registration with passages 15 formed in the floor of the forehearth through which the molten material or glass 16 flows into feeders which are held in place by means of blocks 17.

Each of the feeders is provided with one or more orifices through which a stream or streams of glass or other fiber forming material are delivered. In the embodiment illustrated in Figures 1 and 2, a single, comparatively large stream 20 of glass is delivered from each feeder.

As shown in Figure 2, there are two fiber forming units which are of identical construction. Each of the units is inclusive of a frame 22 in which a shaft 24 is journally supported, the shaft being mounted in bearings contained within a casing 26 carried by the frame. The shaft 24 is equipped with pulleys or sheaves 28 connected by belts 29 with another set of sheaves or pulleys 30 carried by shaft 31 driven by an electric motor 32.

Secured to the lower end of the shaft 24 is a rotor or spinner 35 which is of hollow configuration. Disposed within the spinner is a slinger plate (not shown) or other means for distributing the glass or other molten material into contact with the interior surface of a peripheral wall 39 of the spinner 35. The peripheral wall 39 of the spinner is formed with a large number of openings or orifices 40 through which the molten material is projected. The rotor 35 is rotated at a speed of upwards of 3000 r.p.m. or more or at a speed developing centrifugal forces sufficient to project or deliver the molten material through the openings 40. The stream of glass 20 passes downwardly through the rotating hollow shaft 24 and impinges upon the slinger plate or other glass distributing means in the rotor, the glass being moved outwardly of the axis of the rotor into contact with the inner surface of the peripheral wall 39.

The centrifugal forces of rotation of the rotor act upon the fiber forming material on the interior of the wall 39 causing the material to be extruded or projected through the openings 40 to form the fine streams, elongated bodies or primary filaments 42.

The fine streams, elongated bodies or primaries of glass or other fiber forming material extruded from the spinner or rotor 35 enter a gaseous attenuating blast of sufficient velocity to attenuate the material to fibers. The gaseous blast may be provided by steam, compressed air, intensely hot gases of combustion or other gaseous medium. In the embodiment illustrated, the attenuating blast is formed of intensely hot gases of temperatures upwards of 3000° F. or more, well above the attenuating temperature of the fiber-forming material.

Disposed adjacent and surrounding each of the rotors 35 is an internal combustion burner 45 of generally annular configuration in which is formed one or more combustion zones or chambers 47. The combustion zone 47 may be of annular shape or may be subdivided by suitable radial partitions (not shown) forming separate combustion zones or chambers arranged in an annular pattern. The burner construction may be supported by the frame member 22 or by other suitable supporting means.

A combustible mixture is supplied to the chambers 47 through one or more tubes 49 connected with a supply of combustible mixture which is conveyed to a manifold 50. A wall (not shown) of each of the chambers 47 adjacent its connection with the manifold 50 is formed with a plurality of small channels or passages whereby the combustible mixture is conveyed from the manifold 50 into the combustion zone, the perforated wall providing a fire screen to prevent preignition of the combustible mixture in the manifold 50 and the mixture supply tube 49.

Any suitable fuel gas may be used such as ethane, methane or propane mixed with air or other oxident and delivered into the combustion zone under a comparatively low pressure preferably of from three to ten pounds per square inch. The combustion zones 47 of the burner 45 are lined with a suitable high temperature refractory (not shown). The combustible mixture is substantially completely burned within the confined zones and the gases undergo great expansion as the walls of refractory become heated to incandescence, the temperature of the gases in the combustion zone being 3000° F. or more.

The intensely hot burned gases or products of combustion are discharged from a restricted orifice 52 of substantially annular configuration or shape formed in a lower wall portion of the burner. The intensely hot gases are discharged through the restricted orifice as a high velocity annular blast which engages the projected bodies or primaries 42 attenuating them to fine fibers. The annular blast from the restricted orifice construction 52 moves in a path substantially normal to the movement of the primaries whereby the attenuated fibers are entrained in the blast and travel in a path substantially normal to the path of movement of the primaries in a generally circular cylindrical pattern or hollow beam.

As shown in Figure 2, a fiber-forming unit of the above described character is disposed above each of the movable collecting surfaces provided by rotating drums or members 55 and 56. Each of the drums 55 and 56 is journally supported by frame constructions 58 and 59 shown in Figure 1. The mounting for one end of the drum 55 is shown in Figure 1.

A shaft 60 supporting each drum is mounted in a journal or bearing 62 carried by the frame constructions 58. A sprocket 64 is mounted upon each shaft 60 and is adapted to be driven by a chain (not shown) connected with a motor or other suitable source of power. Each of the drums 55 and 56 at the end opposite the shaft 60 is supported upon pairs of rollers 61 (one of which is shown in Figure 1), the rollers being journaled upon shafts 63 journaled in bearings carried by the frame construction 59. A housing, enclosure or hood 66 is disposed adjacent and surrounding portions of the drums as shown in Figure 2.

The fibers attenuated by each of the fiber-forming units are entrained in the blast and move downwardly as hollow or circular cylindrical beams of fibers designated respectively B and B'. The fibers of the beam B are directed onto the rotating drum 55 and the fibers of the beam B' are directed onto the rotating drum 56. The fibers form individual, comparatively thin layers, webs, or groups 68 of fibers on the drums. The drums 55 and 56 are journaled for rotation on substantially parallel axes and are adapted for rotation in opposite directions as indicated by the arrows in Figure 2 whereby the groups, layers or webs 68 of the fibers are moved by the drums into contiguous relation to form a double layer veil or web 76 which is continuously formed by the rotation of the drums and is discharged from the median zone between the drums as illustrated in Figure 2.

Means is provided effective adjacent the fiber collection or deposition zones or regions of the drums for establishing subatmospheric pressure or suction within the drums to facilitate the deposition and collection of the fibers upon the surfaces of the drums. As illustrated in Figures 1 and 2, the peripheral surfaces of the drums are foraminous or perforated. Disposed within the drums 55 and 56 are receptacles or members 70 which extend substantially full length of the drums having wall portions 72 arranged as shown in Figure 2 subtending a zone or portion of the surface of each of the drums upon which the fibers are collected.

Connected to each of the members 70 is a duct 74 which is in communication with a suction blower or other means for impressing a reduced pressure or suction in the chamber or zone within each drum defined by members 70 whereby suction is effective at the region of the fiber collection or deposition to assist in collecting and holding the fibers to the drum. The suction chambers provided by members 70 also serve to carry away spent gases of the attenuating blasts. The outlet of the suction blower (not shown) may be connected with a centrifugal or cyclone type separator (not shown) for separating or filtering out or recovering fibers that may have entered the apertures in the foraminous surfaces of the collecting drums.

In order to assure proper discharge of the groups or webs 68 of fibers from the drums, a plurality of nozzles 80 are disposed within the drums and just below the zone of juncture of the webs or layers 68 and are adapted to eject air blasts or streams under sufficient pressure to strip or remove the layers or webs from the drums.

The arrangement is inclusive of means for applying a lubricant, coating material or binder to the dual layer web or veil 76. When it is desired to form a mat of the fibers having mass integrity, a binder or fiber-coating material may be utilized in a liquid or dry state for impregnating the veil 76 either as it emerges from the drums or at the lapping station. It is however preferable to use a dry binder in comminuted or powdered form and applicators for distributing dry binder in the veil or web 76 are illustrated in Figures 1 and 2.

As illustrated in Figure 2, the dual layered veil 76 moves downwardly and is suspended in a substantially vertical plane. Arranged at the sides of the veil are binder dispensers or applicators 83 and 84. Each of the applicators is in the form of a tapered trough, each being formed with a longitudinally extending slot 85 through which the dry or powdered binder is discharged.

The binder feeding means includes a hopper 88 associated with a material metering and feeding mechanism 90, the latter being preferably of an electrically energized vibrator type for delivering material into a receptacle 92. A blower 94 is associated with the receptacle 92 for entraining the binder in an air stream which is conveyed through tubes 95 and 96 to the applicators 83 and 84, the binder-laden air stream being discharged through the slots 85 and into the dual layered veil 76.

Disposed respectively opposite the troughs 83 and 84 at each side of the veil is a cylindrical casing 98 enclosing a cylindrical roll (not shown) having a foraminous surface and which is connected with a source of suction to assist in drawing the binder into the veil.

As illustrated in Figure 2, the binder is applied at two different stations, one at each side of the veil. The suction means (not shown) connected with the cylindrical members 98 may be connected with a binder recovering mechanism (not shown) for recovering the excess binder which may be drawn entirely through the veil by suction.

Various binders may be used for the purpose and a powdered binder that has been found to be very satisfactory consists of a composition of Vinsol and phenolformaldehyde in the "B" stage. Vinsol is a thermoplastic resin separated as a fraction from resinous material obtained by solvent extraction or steam distillation of southern pine. Phenolformaldehyde is a thermosetting resin, the mixture of these components or constituents in a mat, when cured, imparting a high degree of mass integrity thereto. Other bonding agents or materials in powdered form may be utilized such as melamine or polyester resins or powdered rosin. It is to be understood that fiber-coating, bonding agents or adhesives may be applied in liquid or aqueous suspensions by spraying the same onto the veil in lieu of the air stream application of dry material as above described.

In order to assist in the distribution of the comminuted binder through the veil, the veil may be vibrated or agitated and thereby stretched to a limited degree after it leaves the binder applying stations. As shown in Figures 1 and 2, shafts 202 are respectively positioned at opposite sides of the veil and are journaled in bearings mounted in housings 204. Supported on each of the shafts 202 is a veil agitating or vibrating means or member 206.

Each of the means 206 is inclusive of a sleeve or cylinder 207 which supports longitudinally extending elements 208 formed of flexible or yieldable material such as rubber, synthetic rubber or the like, the elements 208 being preferably shaped in looped formation as shown in Figure 2. It should be noted that the elements of one means are staggered with respect to the elements of the other means on the opposite side of the veil so that rotation of the means 206 causes the looped elements to alternately engage opposite major faces of the veil to set up a vibration or agitation thereof.

The dual layered veil 76 containing the binder moves downwardly and is collected upon a relatively movable surface such as the upper flight 210 of a foraminous endless type conveyor 212. The binder impregnated veil is collected or deposited upon the conveyor in a manner whereby the veil is folded or lapped upon itself to form a fibrous laminar pack. Means is provided for causing lateral bodily movement of the veil to fold the moving veil upon itself.

The arrangement illustrated for effecting this result utilizes blasts of air or other gas directed alternately against opposite faces of the veil to cause an indulating or swinging movement to facilitate orientation the veil in a multi-layer or laminar pack formation. As shown in Figure 1, manifolds or pipes 214 are respectively disposed at opposite sides of the veil and are connected through a duct or pipe 216 with a source of gas under pressure, for example compressed air, each manifold being provided with a plurality of nozzles 218 shown in Figure 2.

Blasts of air or gas are directed by the groups of nozzles intermittently against opposite sides of the veil. The compressed air or gas delivered through the nozzles 218 is controlled automatically by a two-way valve contained within a housing 217, the valve being actuated by an arm 219 through a cam 220 driven by gearing contained within a housing 222 operated by a motor 224.

The gearing arrangement contained in housing 222 is of the variable speed type enabling regulation of the periods of air ejection from the groups of nozzles 218. Through this arrangement, the extent of undulatory lateral movement of the veil may be controlled to vary the width of the multi-layer pack P from which the mat M is formed by collecting the veil upon the conveyor surface 210. It is to be understood that the veil may be undulated by mechanical means or other suitable mechanism adapted to cause the veil to be lapped or folded upon itself.

The conveyor 212 is adjustably supported so that the upper flight 210 is inclined in a direction of movement of the pack or lapped layers of the veil so as to cause the folds or laps to be assembled with square edges and without wrinkles. The conveyor 212 is mounted upon a frame 226 comprising side sections 228 joined by transversely extending members. The frame is equipped with trunnions 230 journaled in bearings 231 carried by supports 232. The conveyor 212 is supported upon rollers 234, one of which may be driven by means (not shown).

A receptacle or box 236 is disposed beneath the upper flight 210 of the conveyor 212 and is connected with a suction blower (not shown) or other source of reduced pressure whereby there is established adjacent the foraminous conveyor a suction zone or zones of reduced pressure to assist in the collection of the folds or laps of the veil upon the collecting surface.

The inclination or angularity of the upper flight of the conveyor may be adjusted through a means 240 comprising a cable 241 associated with a drum 242 which is rotated through suitable gearing 243 by a manipulating member or crank 244. The pack P formed from the veil is engaged by a compacting or compressing means 245 to form a mat M of desired thickness. The mat is advanced by conveyors 246 and 247 into an oven or zone (not shown) at a temperature sufficient to set or cure the binder in the mat.

The arrangement disclosed in Figures 1 and 2 may be equipped with means for feeding or delivering reinforcing media for assembly with the fibers in the formation of the veil. As shown in Figure 2, there is disposed above the nip zone of the collecting drums 55 and 56 guide rollers 250 and a second group of guide rollers or means 251 spaced from the rollers 250.

Reinforcing material, as for example strands, threads or yarns formed of glass filaments or other textile material 252, from a supply 253 is guided by the rollers 250 and 251 into the nip zone of the fiber collecting drums and is assembled into the veil between the groups of fibers forming the layers of the veil 76.

The pull of the fiber collecting rollers upon the reinforcing material 252 is effective to draw the strands, yarns or threads in spaced parallel relation into assembly with the groups of fibers of the veil. Any number of reinforcing strands, yarns or threads 252 may be delivered between the groups of fibers 68 forming the veil 76.

Reinforcing material such as strands, yarns or threads may be delivered for assembly with the groups of fibers 68 in a manner whereby the reinforcing material is distributed in haphazard orientation or pattern in the veil in loops, swirls or the like to impart added strength characteristics in all directions in the veil and the mat formed therefrom.

As shown in Figure 2, strands, yarns or threads 255 from supply spools 256 are delivered into engagement with the groups of fibers 68 by a means and in a manner to cause the reinforcing material 255 to be haphazardly deposited between the groups of fibers.

One form of means for accomplishing this purpose is an air lance or blower 259 to which compressed air is delivered through a tube 260. The feeding means 259 is of a character wherein the reinforcing material 255 is advanced or fed to the groups of fibers at a linear rate of speed greater than the peripheral speed of the fiber collecting surfaces of the drums 55 and 56. Hence the reinforcing material 255 is overfed in assembly with the fibers and is thus oriented in a haphazard or irregular pattern in the configurations of loop and swirls in the mat.

Figures 3 and 4 illustrate a modified form of the arrangement shown in Figures 1 and 2. In this form, the forehearth 10' is provided with feeders 14' through which flow streams 20 of glass or other fiber-forming material 16' contained in the forehearth. In this arrangement, two fiber-forming units are shown which are arranged in aligned relation longitudinally of the fiber collecting drums 55' and 56' with the axis of the rotors 35' and shafts 24' disposed substantially in a vertical plane passing through the nip zone of the fiber collecting drums or cylinders 55' and 56'.

Each of the fiber-forming units shown in Figures 3 and 4 is similar to the fiber-forming units shown in Figures 1 and 2. The shaft 24' of each unit is equipped with sheaves 28' connected by belts 29' with sheaves 30' driven by a motor 32'. The fiber-forming units are supported upon a frame including longitudinally extending L-shaped members 270 which are connected by members 272, the latter supporting the motors 32'. Each shaft 24' is provided with a rotor 35' having orifices or openings 40' through which glass or other molten material within the rotor is extruded or projected outwardly by centrifugal forces from the rotor as primary filaments or elongated bodies 42'.

A blast producing means in the form of a burner 45' is adapted to burn a combustible mixture in confined zones or chambers 47'. The burned gases in the chambers undergo great expansion and are projected through an annularly shaped restricted orifice 52' as an intensely hot high-velocity blast of a temperature of upwards of 3000° F. or more, above the attenuating temperature of the glass.

The annular blast from the orifice 52' engages the primary filaments 42' and attenuates the filaments to fine fibers, the fibers moving in paths normal to the direction of movement of the primary filaments 42'. The attenuated fibers are entrained in the annular blast and form a generally cylindrical configuration or beam of fibers 275, the fibers of the beam descending onto the fiber collecting drums 55' and 56'. Collection of the fibers of the beam upon the surfaces of the drums 55' and 56' is assisted by the suction or reduced pressure set up within the drums effective throughout the fiber collection zones by means of the arrangement illustrated in Figure 2.

The construction shown in Figures 3 and 4 is especially adaptable for making a fibrous laminar construction or mat of substantial width and more than two fiber forming units may be utilized if desired.

The arrangement shown in Figures 3 and 4 wherein the axis of the beam of fibers from each unit lies in a vertical plane passing through the nip zone of the fiber collecting drums provides for uniform fiber distribution in the fiber collection zones in forming a mat of substantial width. As the beams of fibers move toward and are collected upon the drum surfaces, the circular cylindrical beams are progressively modified to oval shapes and the groups of fibers of each beam, upon reaching the nip or median zones of the drums, are reduced to flat or planar condition.

Thus during fiber collection, the circular cylindrical beam of fibers from each unit is reduced to a flat double layer of a width substantially greater than the diameter of the beam of fibers. By proper spacing of the fiber forming units longitudinally of the collecting drums, a veil or web of fibers of substantial width may be formed. The fibers of adjacent beams may be overlapped as illustrated at 287 to the extent of securing a satisfactory interfelting of the fibers at the lapping zone.

The veil 285 formed from the fibers of the beams 275 may be reinforced with strands, yarns or threads 287. As shown in Figures 3 and 4, the reinforcing material 287 from supply spools 290 is delivered to means 292 for advancing or feeding the reinforcing material into the fiber-collecting zone to be assembled with the fibers on the drums 55' and 56'. The feeding means 292 for the reinforcing strands, yarns or threads may be of the air lance type or other suitable means.

As shown in Figure 3, a number of the feeding means 292 are provided disposed above and longitudinally of the drums 55' and 56' and each feeding means delivers reinforcing material into the fiber-collecting zone The air lance devices 292 may be arranged to deliver the reinforcing material to the fiber collection zone at a greater linear speed than the linear surface speed of the drums 55' and 56' so that the linear reinforcing material is assembled with the fibers on the drums in irregular or undulating pattern as shown in Figure 3.

It is to be understood that if the reinforcing strands, yarns or threads are to be assembled in spaced parallel orientation in the veil, the compressed air delivered to the air lances may be shut off and the strands, yarns or threads 287 drawn into the nip zone of the fiber collecting drums by the frictional pull established through the embedding of the reinforcing material in the fibers of the veil.

Figure 5 illustrates another form of apparatus for carrying out the method of forming and collecting mineral fibers in a manner to orient the fibers into a pattern having the characteristics and advantages of a laminar or laminated construction. The method of fiber collection involved in the arrangement shown in Figure 5 includes the step of collecting the fibers of the beam onto a surface moving in the general direction of the attenuating blast and the fibers entrained therein so as to obtain the benefit of the natural orientation of the fibers entrained in the blast and thereby provide a mat having improved strength and insulating characteristics.

The fiber-forming unit shown in Figure 5 is of the same character as shown in Figures 2 and 4 and includes a rotatable hollow shaft 24a rotated by belts 29a passing over sheaves 28a and 30a and driven by a motor 32a. The peripheral wall of the rotor 35a is formed with perforations 40a through which the molten fiber-forming material from the stream 20 is extruded by centrifugal forces forming elongated bodies or primary filaments 42a which are attenuated to fine fibers through an annular high velocity blast of burned gases from a confined combustion zone 47a projected through an annularly shaped restricted orifice 52a of a burner 45a.

The annular gaseous blast engaging the primary filaments or bodies 42a attenuates the material to fine fibers 295 which are entrained in the blast in a beam-like or circular cylindrical configuration as shown in Figure 5. The beam of fibers is preferably enclosed within a housing 298 formed of sheet metal.

Disposed adjacent an upper portion of the housing 298 at one side of the beam of fibers is a roller 300 and disposed beneath the housing 298 are additional rollers 301 and 302. A flexible endless conveyor 304 of the foraminous or reticulated type is supported by the rollers in the manner shown in Figure 5. The flight 305 of the conveyor suspended between rollers 300 and 302 assumes a curve substantially a catenary in character and the parameter or major length of the flight 305 is disposed in a generally vertical direction or in the general direction of movement of the fibers entrained in the attenuating blast.

Disposed adjacent the flight 305 of conveyor 304 is a receptacle or box 306 forming a chamber 309 connected by means of a duct 310 with a suction blower for establishing a reduced or sub-atmospheric pressure adjacent the flight 305 to assist in collecting the fibers onto the conveyor and disposing of spent gases from the blasts.

Figure 6 is a sectional view through a mat surface M formed from fibers processed by means of the apparatus shown in Figure 5. Figure 6 illustrates the fiber orientation resulting from the use of the method of collecting the fibers upon the apparatus illustrated in Figure 5.

Due to the deposition of the fibers upon a surface of the flight 305 of the conveyor moving in the general direction of flight of the fibers entrained in the blast, the fibers are collected in substantially the orientation or pattern which they occupied in the blast wherein the fibers are disposed in generally parallel relation.

The fibers formed by the apparatus shown in Figure 5 are of staple character and of indiscriminate lengths and the fibers do not extend through the mat from one major face to the other. When fibers extend through a mat from one face to the other they provide facile paths for the transmission of heat through the mat resulting in reduced insulating efficiency. Through the fiber orientation as exemplified in Figure 6, the fibers lie in a generally parallel laminar-like pattern, and the mat formed therefrom is endowed with improved strength characteristics and high insulating properties.

Coating materials such as binders or lubricants may be directed onto the fibers. A lubricant may be employed to minimize interabrasion of fibers in mats where substantial mass integrity is not important. When a substantial degree of mass integrity is desired in the fibrous end product or mat, a binder may be delivered onto the fibers and the mat formed therefrom conveyed through a curing oven or zone to set or cure the binder. As shown in Figure 5 applicators 307 and 308 extending through the walls of the hood 298 are arranged to project or spray lubricant, binder or other coating material onto the fibers while in flight toward the collecting surface 305.

Figure 7 illustrates another form of apparatus for modifying or changing the orientation of the fibers as they are collected into mat formation. In this form of construction, the rotor 35b and the burner 45b are identical with the rotor and burner constructions shown in Figure 5, the rotor being driven by a motor 32b in the manner illustrated in Figure 5.

Rollers 300', 301' and 302' support a conveyor 304' of the endless belt type, and the flight or zone 305' thereof moves downwardly and in the general direction of movement of the fibers attenuated from the primaries 42b by the high velocity blasts of gases projected through the restricted orifice 52b of the burner. Disposed at one side of the flight 305' of the foraminous conveyor is a receptacle 310 forming a suction chamber 312 connected by means of a duct 314 with a suction blower for impressing sub-atmospheric pressure in the chamber 312 to assist in retaining the fibers on the conveyor flight and carrying away spent gases of the blast.

In the form of apparatus of Figure 7, means is provided for further modifying the orientation of the fibers during their collection in mass formation. As shown in Figure 7, rollers 315, 316 and 317 support a moving foraminous belt or conveyor 320 having a flight zone 322 arranged to move downwardly in the general direction of movement of the fibers from the fiber-forming apparatus and converging toward the flight 305' of the conveyor 304' in the manner illustrated.

An idler roller 324 is in engagement with the conveyor 320 and is movable in directions to regulate or control the amount of tension in the conveyor 320. The moving strip or belt 320 may be driven by one of the supporting rollers connected with a driving means or motor (not shown).

A receptacle 326 is disposed adjacent the flight zone 322 providing a chamber 328 connected by means of a duct or tube 330 with a suction blower for impressing suction or subatmospheric pressure adjacent the flight zone 322 of the belt or strip 320. The fibers from the fiber-forming apparatus descend through a hood construction 334 having wall portions 336 which confine the fibers and direct them onto the collecting surfaces or zones 305 and 322 of the endless belts or strips.

One of the features of the invention resides in modifying the fiber orientation or pattern of the collected fibers by moving one fiber engaging conveyor or belt at a speed differential to that of the other belt or conveyor. Thus the endless belt or moving strip 320 may be caused to override or move at a linear speed greater than that of the flight 305' of the conveyor 304'. This overriding or increase in linear speed of one fiber engaging surface with respect to a second fiber engaging surface causes the fibers to be laid in a different pattern.

Figure 8 illustrates diagrammatically the disposition of fibers in a mat formed by the apparatus shown in Figure 7. As indicated in Figure 8, there are three zones of fibers viz: zone A indicating the fibers of the beam of fibers moving into engagement with the flight 322 of the moving belt 320; zone B indicating the fibers from the central zone of the beam, which due to turbulence existing in the beam of fibers are bent or curved substantially upon themselves in U-shaped configuration, and the fibers indicated at zone C are directly collected upon the flight 305' of the conveyor 304'.

Due to the overriding or increased speed of the moving strip 320, the fibers contacting the strip 320 are caused to be deposited in an angular position while the fibers at C are moved into an angular position generally opposite to that of the fibers at A. This orientation or deposition pattern of the fibers in the mat M' is shown in Figure 8. B indicates the U-shaped fibers collected from the turbulent zone between the converging regions of the endless belts or strips 304' and 320.

It will be seen from Figure 8 that fibers at A and C in the mat do not extend from one major face of the mat to the other and that the U-shaped fibers occupy a central zone bounded by the fibers in zones A and C. The fibers in each of the zones A and C tend toward a generally parallel pattern and while the fibers of the zones A, B and C are interfelted to a certain extent, the mat M' is of a laminar character established by the three zones or layers of fibers at A, B and C.

As the fibers formed by the apparatus shown in Figure 7 are of indiscriminate lengths, very few if any fibers in the end product or mat M' extend from one major face of the mat to the other. Therefore through this method of fiber collection and orientation the mat M' has exceptionally high insulating efficiency.

Figure 9 is illustrative of a modified form of apparatus for carrying out the method of reorienting the fibers to form a mat wherein the fibers are disposed in the general pattern indicated in Figure 8. The rotor 35c and the burner 45c of the fiber-forming apparatus of Figure 9 are substantially identical with the corresponding components shown in Figures 5 and 7.

The rotor 35c is rotated at high speed by a motor 32c and an annular blast of intensely hot burned gases projected through a restricted orifice from combustion chambers or zones in the burner 45c, attenuates the material projected through the openings in the rotor 35c to fibers of varying lengths, the fibers being entrained and moving downwardly in the annular blast in a cylindrical or beam-like shape. Disposed at opposite zones adjacent a plane passing through the axis of rotation of the rotor are rotatable members or drums 340 and 342, arranged to rotate in opposite directions, the exterior peripheries of the drums being perforated.

Arranged within the drum 340 is a receptacle 344 forming a suction chamber 346, and disposed within the drum 342 is a receptacle 344' providing a suction chamber 346', the suction or reduced pressure assisting in the collection of the fibers upon the peripheries of the drums 340 and 342. The chambers 346 and 346' are connected by means (not shown) with a suction blower or other medium for establishing reduced pressure.

In this form of apparatus, it is desirable that one of the drums overrides or moves at a linear speed greater than that of the other drum in order to cause tilting or repositioning of the fibers through a substantial angle to provide a mat wherein the fibers are disposed in a laminar-like pattern.

The fibers are carried downwardly by the rotation of the drums 340 and 342 in the direction of the arrows and are collected by the upper flight 350 of a conveyor 355 driven by and supported by rollers, one of which is shown at 357.

A suction chamber 348 may be disposed beneath the conveyor flight 350 to influence the path of movement of the fibers onto the collecting surface provided by the conveyor flight 350. Air tubes 360 disposed within the drums 340 and 342 are provided with orifices or openings disposed to direct compressed air through the foraminous peripheries of the drums 340 and 342 to strip or remove the groups or layers of fibers from the surface zones of the drums after the fibers have been moved out of the influence of the suction zones established by chambers 346 and 346'. By this means the formed fibers deposited upon the drum are prevented from clinging to the drums. The fiber attenuating zone may be enclosed by a hood or enclosure 362 as shown in Figure 9.

Through the differential linear speeds of the drums 340 and 342, the fibers are caused to be moved in directions modifying the positions of the fibers in the mat or end product. The degree of angularity of the fibers adjacent the fiber engaging surface moving at the higher speed is dependent in a large measure upon the difference in linear speeds of travel of the fiber engaging surfaces provided by the peripheries of the drums 340 and 342.

Figure 10 is illustrative of a method and apparatus for distributing reinforcing medium in the form of strands, yarns or threads in the attenuated fibers. The fiber-forming arrangement of Figure 10 is the same as that shown in Figure 5 wherein a blast emanating from an annular restricted orifice 52c engages primaries 42c projected from orifices 40c formed in a peripheral wall of a rotor into which is delivered a stream 20 of molten glass or other fiber-forming mineral material. The blast engaging the primaries attenuates them to fine fibers which move downwardly in the form of a hollow column or beam 351.

The beam of fibers 351 is delivered into a hood or casing 352 preferably of rectangular shape. Disposed adjacent the outlet of the hood 352 is the upper flight 354 of a foraminous conveyor of the endless belt type supported upon rollers 357 and driven by means (not shown) connected with one of the rollers. The fibers of the beam of fibers descend through the hood 352 and are deposited or collected upon the flight 354 of the conveyor.

A receptacle or box 358 disposed below the conveyor flight 342 and in registration with the area defined at the outlet region of the hood 352 provides a chamber 360 connected by means of a duct 361 with a suction blower to assist in collecting the fibers upon the conveyor flight 354 and to carry away spent gases of the attenuating blast.

The arrangement shown in Figure 10 includes devices for delivering reinforcing material in the form of strands, yarns or threads into the region of the descending fibers within the hood 352 whereby the reinforcing material is assembled concurrently with the fibers during their collection upon the conveyor flight 354.

The delivering or distributing units or means for the reinforcing material may be of the air lance type shown at 364 which are connected to a source of compressed air by means of tubes 366.

Supply spools 368 are provided from which strands, yarns or threads 370 of glass fibers or other materials are led to the delivering devices 364. Compressed air conveyed through the devices 364 project the reinforcing strands, yarns or threads 370 into the hood 352 at rates of speed sufficient to provide for a haphazard orientation of the reinforcing material in various directions whereby the reinforcing material is substantially uniformly distributed throughout the collected mass of fibers from the beam 351 of fibers.

The collected mass or web of fibers and reinforcing material may be compacted by a roller 375 to form a reinforced mat M3. If a degree of rigidity or mass integrity is desired in the mat, a binder or adhesive may be delivered onto the collected fibers and reinforcing material and such binder or adhesive subsequently cured to form a bonded product embodying the reinforcing material.

Figure 11 illustrates other means for delivering or projecting reinforcing material into the region of the fibers for collection therewith to form a reinforced mass or mat of fibers. The fibers of the beam 350' are delivered into or through a hood 378 and are collected upon an upper flight 354' of a foraminous conveyor in the same manner as illustrated in Figure 10.

Openings or passages 380 and 380' are formed in the walls of the hood 378 through which reinforcing materials are delivered or projected. In the arrangement shown in Figure 11, a supply of molten glass 382 or other molten fiber-forming material is contained within receptacle 384, and the receptacle is provided with a feeder or bushing 386 formed with orifices through which flows streams of glass or other material.

The streams are attenuated to continuous filaments or fibers by engagement with a rotating wheel or disk 390 at one side of the hood 378. A filament or fiber gathering device 392 is arranged to gather the filaments into a strand so that the strand may be directed into engagement with the feeding wheel 390. It has been found that reinforcing material in the form of a multifilament strand, formed from streams of fiber-forming material from the supply 382, engaging the rotating feeding wheel 390 throughout a substantial angular region of the wheel periphery clings to the wheel with sufficient tenacity enabling the attenuation of the streams to filaments.

The strand may be stripped from the feed wheel or roll by means (not shown) and projected through the opening 380 into the region of the descending fibers of the beam 350' for concurrent collection with the fibers upon the collecting surface 354'. Through this method the strands or reinforcing materials are delivered into the hood 378 at a speed sufficient to deposit the same in loops and swirls throughout the transverse dimension of the fiber collecting zone.

In Figure 11 there is illustrated another form of means for delivering reinforcing material into the hood 378 for assembly with the blast attenuated fibers. A feeder 386' is formed with orifices through which flow streams of glass or other molten fiber-forming material. The streams are attenuated to continuous filaments by engaging them with a pair of pull or feed rolls 396 rotating in directions to attenuate the streams to continuous filaments.

A gathering device or guide means 398 is disposed below the feeder 386' and engages the attenuated filaments to direct them into strand formation prior to their engagement with the feed rolls 396. The strand is directed through a slot 380' by means of a guide or material directing means 400. The strand directing member 400 may be pivotally supported by means of a pin 402 extending into an opening formed in a support 404.

The strand directing member 400 is oscillated by suitable means about the axis of the pin 402 in a direction to distribute the strand 403 over a substantial area in the hood so that the strand is distributed throughout the width of a mass or web of fibers being collected within the hood. As illustrated in Figure 11, the oscillating means for the member 400 includes an arm 406 pivotally connected to a boss formed on member 400. The arm or link 406 is connected by means of a pin 410 with a disk 412 supported upon a shaft 414.

The shaft 414 may be driven by a motor (not shown) or other suitable means. Rotation of the disk 412 through the line 406 causes oscillatory movement of the arm 406 and corresponding oscillatory movement of the strand distributor 400. The reinforcing strands continuously formed by attenuation are delivered into the hood 378 through the transversely extending slot 380'.

The strand is delivered at a linear speed sufficient to cause the material to be assembled with the descending fibers in the form of loops and swirls, and through the assistance of the oscillating distributor 400 the strands are projected in directions transversely of the hood whereby the strands are substantially uniformly distributed throughout the mass or web of fibers collected upon the conveyor flight 354'.

It is to be understood that either or both forms of strand distributing means illustrated in Figure 11 may be used and any number of strand distributing units may be employed depending upon the number of reinforcing strands to be delivered into the mass or web of fibers.

Figure 12 illustrates an apparatus for forming fibers and processing the fibers to form a mat having substantially uniform characteristics throughout its length and width. The fibers are produced by an attenuating unit or means of the character hereinbefore described in which a stream 20c of glass or other molten material is delivered through a hollow shaft 24c into a rotor 35c.

The rotor periphery is formed with orifices 42c through which the molten material is projected into elongated bodies or primaries which are engaged by an annularly-shaped attenuating blast projected through a restricted orifice formed in an internal combustion burner 45c. The elongated bodies projected from the rotor are attenuated to fibers 420 by the blast, the fibers descending through a hood 422 as a hollow beam or circular cylindrical configuration of fibers. The fibers 420 are collected upon the upper flight 426 of an endless belt conveyor. The collected mass 430 of fibers is conveyed by the conveyor flight 426 to a picker station E.

The apparatus at the picker station E includes a drum or roll 432 equipped with spikes and a second drum or roll 434 also equipped with spikes. The drums are journalled for rotation and spaced to accommodate the mass of fibers which is projected between the drums.

The spikes or pickers on the drums 432 and 434 engage the mass of fibers and disject them and also break up any tufts or clumps of fibers to render the fibers individual for subsequent collection in mat formation upon the upper flight 440 of a second conveyor. The picker mechanism at station E is enclosed within a hood or housing 442.

A chamber 444 provided by a receptacle 445 is connected with a suitable source of suction or reduced pressure effective adjacent the flight 440 of the conveyor to influence the deposition of the separated fibers from the picker rolls onto the conveyor, the suction overcoming any tendency of the fibers to become entrained in uncontrolled air currents set up within the hood 442.

The rolls 432 and 434 are rotated at relatively high speeds inducing air flow into the hood which is withdrawn by the suction existent in the chamber 444. The fibers are collected in a web 450 on the conveyor flight 440, the thickness of the web being governed by the speed of the conveyor. The web or mat 450 is advanced by the conveyor flight 440 to a second picker station F where the web or mat 450 of fibers is engaged by spiked rolls or drums 452 and 454 which are of substantially identical construction with rolls 432 and 434 respectively.

The picker rolls 452 and 454 are enclosed within a hood 456. The picket rolls at station F break up and further separate the fibers of the web 450, the fibers being collected upon the upper flight 458 of a foraminous conveyor. The fibers descending through the hood 456 are substantially individual and are collected on the conveyor flight 458 to form a mat M5 of substantially uniform characteristics as the fibers are homogeneously distributed throughout the mat.

A receptacle 460 disposed beneath the flight 458 of the foraminous conveyor provides a chamber 462 which is connected with a source of suction or reduced pressure whereby reduced pressure is established in the chamber 462 influencing and assisting in the deposition of the fibers onto the conveyor flight 458. The thickness of the mat M5 may be regulated by controlling the speed of travel of the conveyor flight 458 moving in a righthand direction as viewed in Figure 12 and a compacting or sizing roll 464 disposed at the exit of the hood 456.

A binder may be applied to the mat M5 by applicators 466 located respectively above and below the mat. If a heat curable or settable binder such as phenolformaldehyde or urea-formaldehyde is employed, the binder impregnated mat is advanced by a conveyor 470 through an oven or curing zone 472 containing heating elements (not shown) providing sufficient heat to set or cure the binder in the mat M5. The mat may be coiled into a roll 476 or other suitable shape for shipment. Through this arrangement a mat may be formed of very fine glass or other mineral fibers in which the fibers are substantially uniform distributed providing uniform density and strength characteristics.

Figure 13 illustrates a fiber-forming unit of the character shown in Figure 12 wherein a stream of glass 20d is delivered through a hollow shaft 24d into a rotor 35d. The molten glass or other mineral material within the rotor is projected through orifices in the rotor wall to form elongated bodies or primaries which are attenuated to fibers 480 by an attenuating blast projected through an annularly-shaped restricted orifice formed in a lower wall of a combustion chamber 45d. The attenuated fibers are delivered into a hood 482.

Mounted upon an arm or member 484 supported upon a frame 485 is a fiber severing means. The fiber severing means includes a shaft 486 journalled upon the end of the arm 484, the shaft carrying a hub member 487 provided with radially-projecting fiber severing knives or blades 488. The axis of the shaft 486 is preferably aligned with the axis of the rotor 35d and the blades 488 are of a length to engage the fibers of the beam of attenuated fibers formed by the attenuating blast. The shaft 486 is provided with a sheave 490 connected by a belt 491 with a sheave 492 driven by a motor 493 or other suitable source of power.

The attenuated fibers 480 are severed into shorter length fibers 480' by the rotating blades 488. The severed fibers 480' descend through the hood 482 onto the upper flight 495 of a conveyor which is moved in a right-hand direction as viewed in Figure 13. The accumulated mass of fibers 480' on the conveyor may be advanced thereby to the picker station E' for further processing by the use of the apparatus shown in Figure 12 or other means of forming a mat or other fibrous product of the fibers 480'.

It is apparent that, within the scope of the invention, modifications and different arrangements may be made other than is herein disclosed, and the present disclosure is illustrative merely, the invention comprehending all variations thereof.

We claim:

1. A method of forming and collecting fibers of heat-softenable mineral material including the steps of flowing a stream of the fiber-forming material from a supply, projecting the material of the stream by centrifugal forces to form elongated bodies, engaging the bodies with a high velocity gaseous blast of a temperature above the softening temperature of the material to attenuate the bodies to fibers, and collecting the fibers out of the blast upon a flexible surface of catenary-like contour moving in the general direction of the blast.

2. A method of forming and collecting fibers of heat-softenable mineral material including the steps of flowing a stream of the fiber-forming material from a supply, projecting the material of the stream by centrifugal forces to form elongated bodies, engaging the bodies with a high velocity gaseous blast to attenuate the bodies to fibers, collecting the fibers out of the blast upon a surface extending across and inclined with respect to the path of the gases of the blast and moving in the general direction of the blast whereby the fibers are collected in substantially the pattern of orientation of the fibers entrained in the blast.

3. A method of forming and collecting fibers of heat-softenable material including the steps of flowing molten material from a supply, engaging the material by a high velocity gaseous blast to attenuate the material to fibers, directing the fibers between two surfaces moving in the general direction of the blast and at different speeds whereby to modify the orientation of the fibers, and collecting the fibers in a group.

4. A method of processing fibers including the steps of continuously directing fibers toward a movable surface, collecting the fibers on the surface, continuously advancing the surface to convey the fibers from the collecting zone, and simultaneously engaging a portion of the fibers with a second surface moving at a different speed than that of the first surface and in a direction to effect a reorientation of the fibers adjacent the second surface relative to those adjacent the collecting surface.

5. A method of processing fibers including the steps of continuously directing fibers toward a movable surface, collecting the fibers on the surface in a mass, continuously advancing the surface to convey the mass of fibers from the collecting zone, and engaging the advancing mass of fibers with a second surface for changing the position of a substantial portion of the mass of fibers adjacent one major surface of the mass relative to the remainder of the mass whereby individual fibers do not extend through the mass from one major surface of the mass to the other.

6. A method of forming and collecting fibers of heat-softenable mineral material including the steps of flowing a stream of heat-softened material from a supply, projecting the material of the stream by centrifugal forces to form elongated bodies, engaging the bodies with a high velocity annularly shaped gaseous blast to attenuate the bodies to fibers in a hollow beam formation, collecting the fibers of the beam on converging surfaces, moving the respective surfaces at different speeds to form the collected fibers into a web, and impregnating the web with a binder.

7. A method of forming and collecting fibers of heat-softenable mineral material including flowing a stream of heat-softened material from a supply, projecting the material of the stream by centrifugal forces to form elongated bodies, engaging the bodies with a high velocity gaseous blast of a temperature above the softening temperature of the material to attenuate the bodies to fibers, engaging the attenuated fibers while entrained in the gases of the blast with an instrumentality severing the fibers into comparatively short lengths, collecting the severed fibers out of the blast, applying a binder to the severed fibers, assembling the binder-laden fibers into a mat, and conveying the mat through a zone to set the binder.

8. Apparatus of the character disclosed, in combination, means for flowing a stream of molten fiber-forming material from a supply, means for establishing and directing a high velocity gaseous blast into engagement with the material of the stream to attenuate the material to fibers, a pair of movable convergingly arranged surfaces, means for moving the surfaces at different rates of speed, said attenuated fibers being directed by the blast into engagement with the surfaces whereby the moving surfaces rearrange the fibers as they are advanced by the moving surfaces.

9. Apparatus of the character disclosed, in combination, means for flowing a stream of molten fiber-forming material from a supply, means for establishing and directing a high velocity gaseous blast into engagement with the material of the stream to attenuate the material to fibers, a pair of foraminous surfaces having portions movable in generally converging relation, means for moving the surfaces at different rates of speed, said attenuated fibers being directed by the blast into engagement with the surfaces whereby the moving surfaces rearrange the fibers as they are advanced by the surfaces.

10. Apparatus of the character disclosed, in combination, a frame, a hollow rotor journaled for rotation on the frame, means for flowing a stream of molten fiber-forming material from a supply into the rotor, said rotor being formed with a plurality of orifices in a wall thereof, means for rotating the rotor to project the material through said orifices in the form of elongated bodies, means for directing an annularly shaped, high velocity gaseous blast into engagement with the bodies to attenuate the bodies to fibers, a pair of cylindrical members having foraminous surfaces upon which the attenuated fibers are deposited, means for rotating the members at different speeds and in directions to modify the orientation of the fibers and to combine the fibers collected thereon into a web, and means for applying a coating material to the fibers.

11. A method of forming a fibrous product including delivering molten fiber-forming material into engagement with a rotor, revolving the rotor at a speed to project the material by centrifugal forces into elongated bodies, engaging the bodies with a high velocity gaseous blast to attenuate the bodies to individual fibers, concomitantly flowing streams of molten material from a supply, continuously attenuating the stream to filaments, continuously collecting the fibers upon a movable surface, directing the continuous filaments into the region of the collection of the fibers, assembling the continuous filaments with the fibers as they are collected upon the movable surface, and continuously conveying the assemblage of individual fibers and filaments from the fiber and filament collecting zone.

12. Apparatus of the character disclosed, in combination, a frame, a hollow rotor journaled for rotation on the frame, means for flowing molten fiber-forming material from a supply into the rotor, said rotor being formed with a plurality of orifices in a wall thereof, means for rotating the rotor to project the material through said orifices in the form of elongated bodies, means for directing an annularly shaped, high velocity gaseous blast into engagement with the bodies to attenuate the bodies to fibers, a relatively movable fiber collecting surface, means for flowing a group of streams of molten material from a supply, means for attenuating the streams of the group into continuous filaments concomitantly with the attenuation of the elongated bodies to fibers, and means for directing the filaments into the region of flight of the fibers entrained in the blast whereby the fibers and filaments are concomitantly collected upon the movable surface.

References Cited in the file of this patent

UNITED STATES PATENTS

| | | |
|---|---|---|
| 2,328,714 | Drill et al. | Sept. 7, 1943 |
| 2,409,066 | Powell et al. | Oct. 8, 1946 |
| 2,497,369 | Peyches | Feb. 14, 1950 |
| 2,609,566 | Slayter et al. | Sept. 9, 1952 |
| 2,624,912 | Heymes et al. | Jan. 13, 1953 |
| 2,731,066 | Hogendobler et al. | Jan. 17, 1956 |
| 2,732,885 | Van der Hoven | Jan. 31, 1956 |
| 2,736,362 | Slayter et al. | Feb. 28, 1956 |